(12) United States Patent
Ebeling et al.

(10) Patent No.: US 8,233,266 B2
(45) Date of Patent: Jul. 31, 2012

(54) ENERGY STORAGE MODULE

(75) Inventors: Hans Heinrich Ebeling, Karlsruhe (DE); Walter Ehrhardt, Königsbach-Stein (DE); Andreas Fuchs, Erlangen (DE); Markus Matthias Gaudenz, Erlangen (DE); Alexander Hahn, Röttenbach (DE); Armin Keβler, Ettlingen (DE); Jochen Neutz, Karlsruhe (DE); Karsten Rechenberg, Dormitz (DE); Manfred Waidhas, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 468 days.

(21) Appl. No.: 12/311,318

(22) PCT Filed: Sep. 27, 2007

(86) PCT No.: PCT/EP2007/060253
§ 371 (c)(1),
(2), (4) Date: Apr. 22, 2009

(87) PCT Pub. No.: WO2008/037763
PCT Pub. Date: Apr. 3, 2008

(65) Prior Publication Data
US 2010/0002409 A1 Jan. 7, 2010

(30) Foreign Application Priority Data
Sep. 28, 2006 (DE) .......... 10 2006 046 042

(51) Int. Cl.
*H01G 9/00* (2006.01)

(52) U.S. Cl. ........ 361/502; 361/503; 361/504; 361/509; 361/512; 361/525

(58) Field of Classification Search .......... 361/502, 361/503–504, 509–512, 516–519, 523–525; 428/403, 407
See application file for complete search history.

(56) References Cited

U.S. PATENT DOCUMENTS

| | | | |
|---|---|---|---|
| 3,385,467 A | 5/1968 | Lindenberg et al. | |
| 4,893,217 A | 1/1990 | Schweikert et al. | |
| 4,992,910 A | 2/1991 | Evans | |
| 5,143,803 A | 9/1992 | Andres et al. | |
| 6,771,487 B1 | 8/2004 | Vetter | |
| 7,160,615 B2 * | 1/2007 | Iwaida et al. | 428/403 |
| 7,384,686 B2 * | 6/2008 | Penneau et al. | 428/317.9 |

(Continued)

FOREIGN PATENT DOCUMENTS
DE 970331 9/1958
(Continued)

OTHER PUBLICATIONS

European Office Action dated Oct. 18, 2010 in corresponding European Application No. 07820644.8-2214.
(Continued)

*Primary Examiner* — Nguyen T Ha
(74) *Attorney, Agent, or Firm* — Harness, Dickey & Pierce, P.L.C.

(57) ABSTRACT

Energy storage modules generally include a housing with component parts arranged therein. The component parts are in this case either capacitors, for example double-layer capacitors and/or electrolyte capacitors. According to the invention, a filler is provided in the housing and binds electrolyte liquid occurring in the even of damage or else electrolyte gases. Beds of material with a large specific surface area, such as zeolites or else active carbons, are suitable as fillers. The surfaces are also possibly catalytically coated.

31 Claims, 1 Drawing Sheet

U.S. PATENT DOCUMENTS

2003/0067735 A1    4/2003    Wilk et al.

FOREIGN PATENT DOCUMENTS

| | | |
|---|---|---|
| DE | 199 18 090 | 11/2000 |
| DE | 10128672 | 12/2002 |
| DE | 10128672 A1 | 12/2002 |
| DE | 10157272 | 6/2003 |
| DE | 10157272 C2 | 10/2003 |
| DE | 102005007607 | 8/2006 |
| DE | 102005007607 A1 | 8/2006 |
| DE | 10 2005 041 604 | 3/2007 |
| EP | 052446 | 3/1986 |
| EP | 0 322 551 | 7/1989 |
| EP | 0454015 | 10/1991 |
| JP | 1 297 812 | 11/1989 |
| JP | 04033321 A | 2/1992 |
| JP | 06205927 A | 7/1994 |
| JP | 08071352 A | 3/1996 |
| JP | 11054356 A | 2/1999 |
| JP | 11136960 A | 5/1999 |
| JP | 2002119454 A | 4/2002 |
| JP | 2003197487 A | 7/2003 |
| JP | 2003297699 A | 10/2003 |
| JP | 2005245998 A | 9/2005 |
| JP | 2005272296 A | 10/2005 |
| RU | 2183877 C2 | 6/2002 |
| WO | WO 2007/025980 A2 | 3/2007 |

OTHER PUBLICATIONS

An abstract of WIPO Publication No. WO 2007025980, published Mar. 8, 2007.

Search Report dated Jan. 18, 2008 in corresponding PCT Application No. PCT/EP2007/060253.

Office Action dated Jan. 29, 2009 in corresponding German Application No. 102007046578.

Japanese Office Action dated Jan. 31, 2012 for corresponding Japanese Application No. 2009-529703 (with English translation).

Office Action dated Feb. 12, 2012 in Israeli Patent Application No. 197534, with English translation.

* cited by examiner

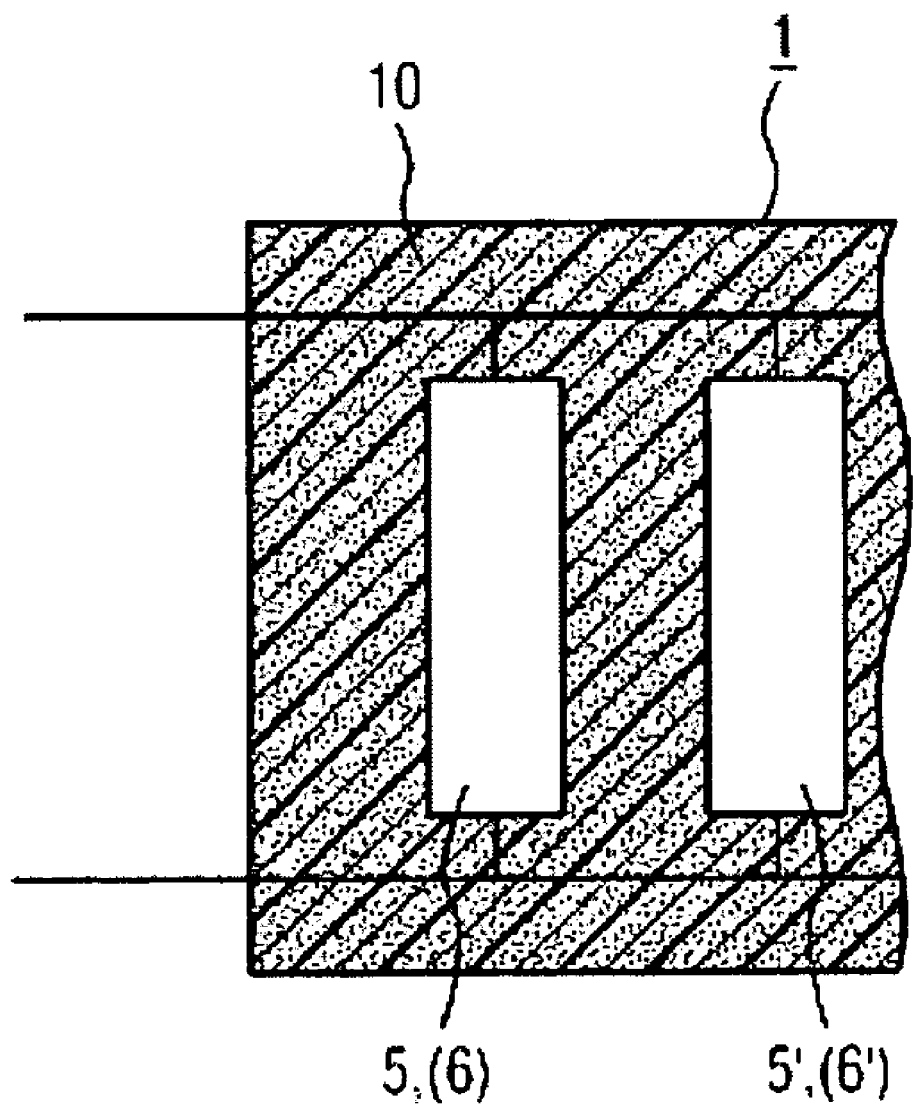

ENERGY STORAGE MODULE

PRIORITY STATEMENT

This application is the national phase under 35 U.S.C. §371 of PCT International Application No. PCT/EP2007/060253 which has an International filing date of Sep. 27, 2007, which designated the United States of America and which claims priority on German application No. 10 2006 046 042.1 filed Sep. 28, 2006, the entire contents of each of which are hereby incorporated herein by reference.

FIELD

At least one embodiment of the invention generally relates to an energy storage module.

BACKGROUND

Energy storage modules are known from the prior art, in respect of which reference is made for example to the German patent application DE 10 2005 041 604 A1, not previously published, in the name of the applicant and entitled "Device comprising at least one double-layer capacitor". Energy storage modules of this type comprise a housing with components, for example capacitors, which are arranged therein and in which a combustible organic electrolyte is present. Under unfavorable boundary conditions, such an electrolyte can cause an explosion or a deflagration.

In capacitors, in particular double-layer capacitors, but also electrolytic capacitors, and lithium batteries, primarily organic electrolytes are used, which, if they escape in the event of a fault or damage, constitute a potential fire hazard or even explosion hazard. In some instances, said organic electrolytes also have a low vapor pressure. In order as far as possible to avoid an excessive increase in pressure and hence opening of the cell, electrolytes having a higher boiling point are also used. However, component parts comprising such electrolytes are then impractical for use at extremely low temperatures.

In present-day high-power systems which use readily combustible electrolytes, therefore, the passive safety is enhanced by extensive safety devices, for example redundant electronic monitoring devices, or installation sites are chosen where either critical ambient conditions can be precluded or any course of damage, e.g. a fire or an explosion, cannot cause harm to any persons.

This last means that the systems described often cannot be positioned at the functionally inherently favorable site.

In a typical case of damage, the modules release air admixed with gaseous electrolyte to the surroundings. A critical concentration of the gaseous electrolyte has to be precluded by rapid dissipation.

In the current technical development, the endeavor already resides in making the energy storage modules intrinsically safe, such that no case of fault can occur. Various proposals have already been made in respect of this in the patent application in the name of the applicant that was cited in the introduction.

DE 101 57 272 C2 discloses a lithium or lithium-ion battery in which a non-combustible sorbent is present in the associated housing. Furthermore, DE 101 28 672 A1 and DE 10 2005 007 607 A1 disclose capacitor arrangements which have in the housing in each case media which absorb capacitor emissions and which are situated at the bottom of the housing.

SUMMARY

At least one embodiment of the invention further improves the intrinsic safety of energy storage modules or module housings which comprise double-layer capacitors or electrolytic capacitors, in order that the entire system also meets more stringent safety requirements.

The intention is to provide such an energy storage module in the case of which the module can be constructed more favorably or incorporation into those installations which have contact with persons, for example in railroad installations, also becomes permissible as a result.

At least one embodiment of the invention is directed to an energy storage module.

The subject matter of at least one embodiment of the invention is directed to an energy storage module in which, in the event of a fault, for example in the case of overloading or in the case of mechanical damage, the filler limits the free path length of emerging vapors. In the case of an ignition of the vapors, a flashback into the cell and also an explosive flame propagation are thus prevented. Furthermore, the emerging electrolyte is bound, whereby a reduction of the fire load e.g. by spraying around is avoided. In total a fire tendency or explosion tendency is significantly reduced. In this case, the filler is preferably present as a bed of materials having a large specific surface area, such as zeolites or activated carbon.

For the latter purpose, the free spaces between the individual cells and around the cells of a module are advantageously provided with a suitable filling. The filler used in this case is chosen such that it restricts the average free path length of emerging gases and has the ability to bind the quantity of electrolyte emerging. Therefore, not only is the principle of ignition protection realized, but also reliable adsorption of the emerging gases is advantageously ensured.

In the case of at least one embodiment of the invention, the pressure increase advantageously remains within the module housing in the noncritical region and the entire module remains closed off in a gas-tight manner. For the case where the module housing is additionally mechanical damaged, the electrolyte-binding filling provides for a minimization of the emerging electrolyte vapors and hence of the consequential damage.

As already mentioned, zeolites or activated carbon, which, as is known, are distinguished by their open-pored nature and, associated therewith, in each case large specific surface areas, are advantageously used as filler for the intended purpose. The so-called BET surface area is specified as a measure of this, and it should be >20 $m^2/g$. In this case, the activated carbon, in particular, as filler can additionally have a catalytic coating at the pore surfaces. Noble metals such as platinum or rhodium, for example, are preferably suitable as catalytic coating. Such a coating can promote reactions, whereby the gases that arise are removed by reacting slowly under controlled temperature characteristics—e.g. are slowly oxidized. This counteracts an insidious evolution of pressure that can result in the module housing bursting apart.

BRIEF DESCRIPTION OF THE DRAWINGS

Further details and advantages of the invention will become apparent from the following description of figures in respect of example embodiments with reference to the drawing in conjunction with the patent claims.

The single FIGURE shows a roughly schematic illustration of an energy storage module comprising component parts and components situated in said module.

DETAILED DESCRIPTION OF THE EXAMPLE EMBODIMENTS

The FIGURE illustrates an energy storage module essentially comprising a housing 1 that is hermetically sealed toward the outside. In the module housing 1, a number of capacitors are connected as singular cells one after another, which realize an energy store for intended application in industrial installations, in particular also vehicles for transporting persons. Suitable capacitors include double-layer capacitors 5, in particular. As an alternative thereto, known electrolytic capacitors 6 can also be used. Double-layer capacitors 5, 5', 5", . . . are specifically indicated in the FIGURE.

The double-layer capacitors 5 or electrolytic capacitors 6 used respectively use a combustible organic electrolyte. In the event of damage, a fire, explosion or at least a deflagration can occur in this case. Suitable safety measures must therefore be provided. These are intended to fulfill the principle of intrinsic safety, that is to say that no further functional elements are permitted to be required.

It is now proposed to provide the free spaces between and around the individual cells $5_i$ or $6_i$ with a suitable filling material 10.

Activated carbon is porous and open-pored and therefore has a large specific surface area. What is achieved by way of the activated carbon is that firstly the average free path length of emerging gases is restricted. Flashback protection is thus achieved.

Furthermore, specifically the activated carbon has the ability to bind the quantity of electrolyte emerging by adsorption and/or absorption. What is thus achieved is that the pressure increase remains within the module housing in the noncritical region and the entire energy storage module is closed off in a gas-tight manner. This holds true even for the inherently unlikely case where the housing 1 of the energy storage module itself is damaged and gas could penetrate toward the outside.

The activated carbon therefore ensures a safeguard both for a liquid electrolyte and for a gaseous electrolyte. For this purpose, if appropriate, catalytic coatings can also additionally be present on the free surfaces of the filler. Either platinum (Pt) or rhodium (Rh) are suitable in a known manner as catalytic coatings. As an alternative to the activated carbon it is possible to use zeolites having large internal surface areas.

Furthermore, sepiolite and tobermorite are appropriate as alternative porous sorbents. What is crucial in the case of the fillers specified is that an essentially adsorbent effect is present, which necessitates a large internal surface area. The so-called BET (Brunauer, Emmett, Teller) surface area is used as a measure thereof, and should be greater than $20 \, m^2/g$, preferably above $100 \, m^2/g$. This has to be ensured by corresponding selection in the case of said zeolite, sepiolite, tobermorite and by activated carbon. A catalytic coating can additionally be present in this case.

The latter materials can be introduced as a filler having a bulk density of $>0.3 \, g/cm^3$ into the housing.

The above-described configuration of the energy storage module can increase the intrinsic safety of modules comprising double-layer capacitors and lithium batteries using passive means and hence in particular cost-effectively and particularly reliably.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An energy storage module, comprising:
    storage components including at least one organic, combustible electrolyte; and
    a filler that increases passive safety in a module housing in which the storage components including the at least one organic, combustible electrolyte are situated, the filler having a catalytic coating on surfaces thereof.

2. The energy storage module as claimed in claim 1, wherein the storage components are electrolytic capacitors.

3. The energy storage module as claimed in claim 2, wherein the filler prevents fire propagation or explosion propagation in the module housing by limiting an average free path length of emerging electrolyte vapors within the module housing.

4. The energy storage module as claimed in claim 3, wherein the filler binds the emerging electrolyte vapors by at least one of adsorption and absorption.

5. The energy storage module as claimed in claim 1, wherein the storage components are double-layer capacitors.

6. The energy storage module as claimed in claim 5, wherein the filler prevents fire propagation or explosion propagation in the module housing by limiting an average free path length of emerging electrolyte vapors within the module housing.

7. The energy storage module as claimed in claim 6, wherein the filler binds the emerging electrolyte vapors by at least one of adsorption and absorption.

8. The energy storage module as claimed in claim 1, wherein the filler prevents fire propagation or explosion propagation in the module housing by limiting an average free path length of emerging electrolyte vapors within the module housing.

9. The energy storage module as claimed in claim 8, wherein the filler binds the emerging electrolyte vapors by at least one of adsorption and absorption.

10. The energy storage module as claimed in claim 1, wherein the filler is in the form of a bed.

11. The energy storage module as claimed in claim 10, wherein the bed has a particle distribution of between 0.5 mm and 5 mm and a bulk density of greater than $0.3 \, g/cm^3$.

12. The energy storage module as claimed in claim 1, wherein the filler has a Brunauer, Emmett, Teller (BET) surface area of at least $20 \, m^2/g$.

13. The energy storage module as claimed in claim 1, wherein the filler has a Brunauer, Emmett, Teller (BET) surface area of at least $100 \, m^2/g$.

14. The energy storage module as claimed in claim claim 1, wherein the catalytic coating is a noble metal.

15. The energy storage module as claimed in claim 14, wherein the catalytic coating is at least one of platinum and rhodium.

16. The energy storage module as claimed in claim 1, wherein the filler is activated carbon having a Brunauer, Emmett, Teller (BET) surface area of between $500 \, m^2/g$ and $2000 \, m^2/g$.

17. The energy storage module as claimed in claim 16, wherein
    the activated carbon has open pores, and
    the catalytic coating is applied to surfaces of the open pores of the activated carbon.

18. The energy storage module as claimed in claim 1, wherein the filler is a zeolite.

19. The energy storage module as claimed in claim 18, wherein the filler is sepiolite.

20. The energy storage module as claimed in claim 18, wherein the filler is tobermorite.

21. The energy storage module as claimed in claim 1, wherein the filler is activated carbon having a Brunauer, Emmett, Teller (BET) surface area of between 500 $m^2/g$ and 2000 $m^2/g$.

22. The energy storage module as claimed in claim 1, wherein the module housing is hermetically sealed.

23. The energy storage module as claimed in claim 1, wherein the filler surrounds each of the storage components.

24. An energy storage module, comprising:
a module housing including,
storage components including at least one organic, combustible electrolyte;
a filler that increases passive safety in the module housing, surfaces of the filler being catalytically coated.

25. The energy storage module as claimed in claim 24, wherein the module housing is hermetically sealed.

26. The energy storage module as claimed in claim 24, wherein the filler prevents fire propagation or explosion propagation in the module housing by limiting an average free path length of emerging electrolyte vapors within the module housing.

27. The energy storage module as claimed in claim 26, wherein the filler binds the emerging electrolyte vapors by at least one of adsorption and absorption.

28. A housing, comprising:
storage components including at least one organic, combustible electrolyte;
a filler that increases passive safety in the housing; and
a catalytic coating on an outer surface of the filler.

29. The housing as claimed in claim 28, wherein the housing is hermetically sealed.

30. The housing as claimed in claim 28, wherein the filler prevents fire propagation or explosion propagation in the housing by limiting an average free path length of emerging electrolyte vapors within the housing.

31. The housing as claimed in claim 30, wherein the filler binds the emerging electrolyte vapors by at least one of adsorption and absorption.

\* \* \* \* \*